Patented July 12, 1927.

1,635,883

UNITED STATES PATENT OFFICE.

KARL DAIMLER, FRANZ MARSCHALL, AND GERHARD BALLE, OF HOCHST-ON-THE-MAIN, GERMANY, ASSIGNORS, BY MESNE ASSIGNMENTS, TO GRASSELLI DYESTUFF CORPORATION, OF NEW YORK, N. Y., A CORPORATION OF DELAWARE.

WATER-SOLUBLE CONDENSATION PRODUCT AND PROCESS OF MAKING SAME.

No Drawing. Application filed December 10, 1924, Serial No. 755,099, and in Germany August 12, 1922.

We have found that water-soluble condensation products are obtained by treating in the heat with strong sulfonating agents, for instance, oleum or mixtures of oleum and chlorosulfonic acid, the resinous oil condensation products of polynucleal aromatic hydrocarbons, for instance naphthalene, with aralkylhalides or arylhalides containing a reactive halogen, such as benzylchloride. This action of strong sulfonating agents may, of course, also be effected upon the condensation products in statu nascendi, if their formation is caused by the simultaneous addition of the various components in the course of the reaction.

The benzylnaphthalene sulphonic acid resins obtainable according to this invention, as well as their salts, are of excellent utility for the most varied purposes in practical chemistry, in the art of dyeing and in pharmacy, for instance as emulsifying and frothing agents.

Instead of benzyl chloride there may be used with similar results benzyl bromide, xylyl chloride and similar arylalkyl halides or aryl halides having reactive halogen, i. e., a halogen atom occupies the place of a hydrogen atom in the hydrocarbon nucleus, such for instance as dichlorodihydronaphthalene. For the naphthalene may be substituted similar aromatic polynucleal hydrocarbons, for instance methylnaphthalene, tetrahydronaphthalene, anthracene or the like.

The following example illustrates our invention, the parts being by weight:

Into 100 parts of the oil prepared by heating naphthalene and benzyl chloride in absence of a condensing agent is quickly run at 80–90° C. a mixture of 25 parts of oleum of 20 per cent strength and 70 parts of chlorosulphonic acid. The mass after being stirred for a short time becomes completely soluble in water. After neutralizing by the addition of about 143 parts of caustic soda lye of 40° Baumé specific gravity the syrupy substance thus obtained is dried and pulverized. The yellowish-white powder produced is readily soluble in water and imparts practically no colour to wool and cotton. Its solution when acidified, precipitates gelatine.

We claim:

1. Process of producing water-soluble condensation products which consists in treating with a powerful sulfonating agent the resinous oil condensation product obtainable by heating in the absence of a condensing agent an aralkylhalide with an aromatic polynucleal hydrocarbon.

2. Process of producing water-soluble condensation products, which consists in treating with a powerful sulfonating agent the resinous oil condensation product obtainable by heating in the absence of a condensing agent benzylchloride with an aromatic polynucleal hydrocarbon.

3. Process of producing water-soluble condensation products, which consists in treating with a powerful sulfonating agent the resinous oil condensation product obtainable by heating in the absence of a condensing agent benzyl chloride with naphthalene.

4. As a new product, the water-soluble sulfonated condensation product containing at least one sulfur group substantially identical with that obtainable by treating with a strong sulfonating agent the resinous oil condensation product obtainable by heating in the absence of a condensing agent an aralkyl halide with an aromatic polynucleal hydrocarbon.

5. Process of producing water-soluble condensation products which consists in treating with a powerful sulfonating agent the resinous oil condensation product obtainable by heating in the absence of a condensing agent an aromatic compound containing a reactive halogen with an aromatic polynucleal hydrocarbon.

6. As a new product, the water-soluble sulfonated condensation product containing at least one sulfo group substantially identical with that obtainable by treating with a strong sulfonating agent the resinous oil condensation product obtainable by heating in the absence of a condensing agent an aromatic compound containing a reactive halogen with an aromatic polynucleal hydrocarbon.

In testimony whereof we affix our signatures.

Dr. KARL DAIMLER.
Dr. FRANZ MARSCHALL.
Dr. GERHARD BALLE.